UNITED STATES PATENT OFFICE.

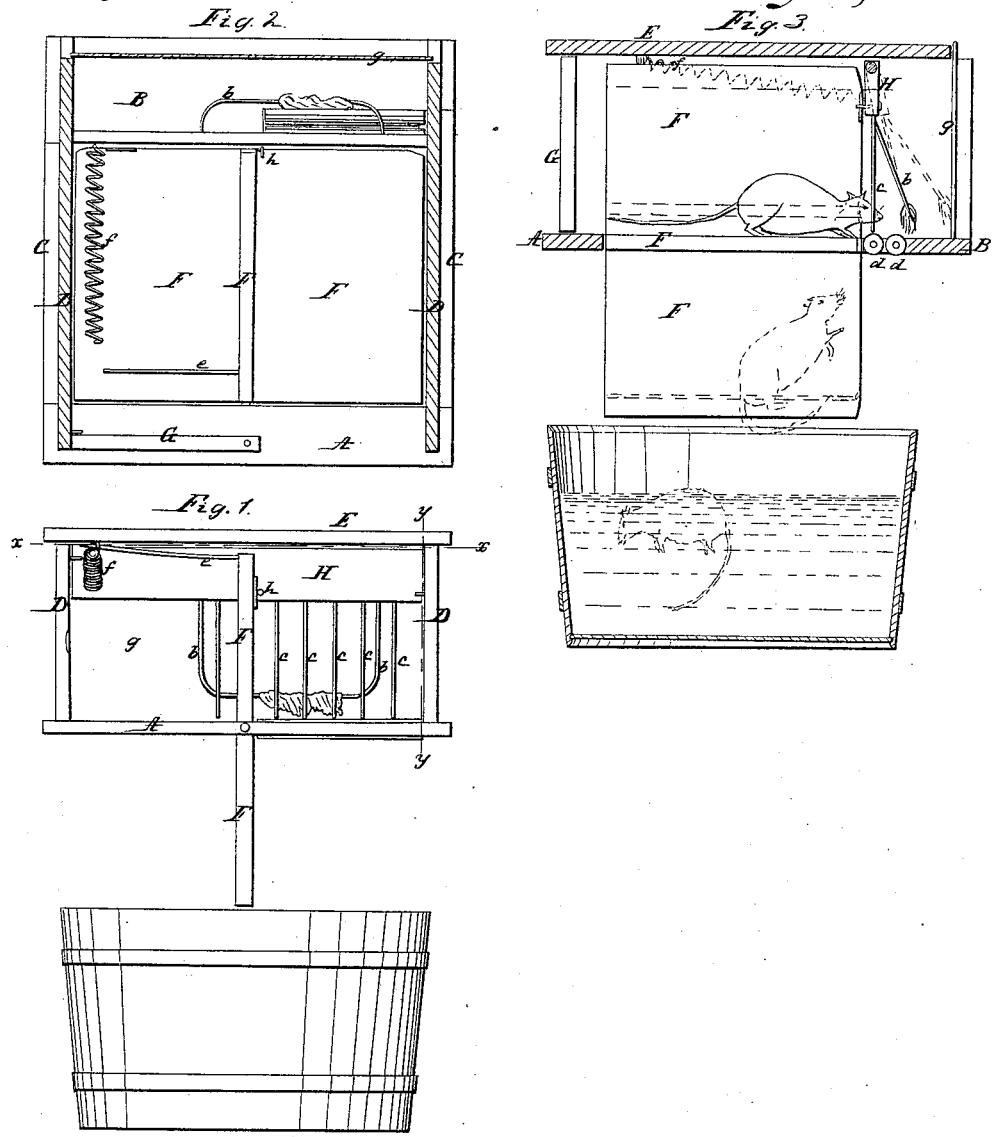

GEORGE SLUSSER, OF HILLSBORO, OHIO.

ANIMAL-TRAP.

Specification of Letters Patent No. 29,627, dated August 14, 1860.

*To all whom it may concern:*

Be it known that I, GEORGE SLUSSER, of Hillsboro, in the county of Highland and State of Ohio, have invented a new and Improved Animal-Trap; and I do hereby declare that the following is a full and exact description thereof, reference being had to the accompanying drawings, which form a part of this specification, in which—

Figure 1, is a front view of said trap; Fig. 2, a horizontal section in the line $x$, $x$, of Fig. 1; and Fig. 3, a vertical section in the line $y$, $y$, of Fig. 1.

Similar letters indicate corresponding parts in each of the drawings.

In constructing my improved animal-trap, I first construct an open rectangular base-frame, which is represented in the drawings as being composed of the front strip A, the rear strip B, and the side-strips C, C. I then secure the lower edges of the opposite box-sides D, D, to the side strips C, C, of said frame, and then unite the upper edges of said sides by means of the cover E, which forms the top of the trap. The next step in the construction of my improved animal trap, is to firmly unite four wings F, F, F, F, to each other around a common center in such a manner that each wing shall project at right angles to the wings on each side of the same, and then pivot the said connected wings to the central portions of the ends A, B, of the base frame of the trap. The length and breadth of the wings F, F, F, F, is represented in the drawings; and is as great as the opening within the base-frame of the trap will receive and allow to rotate therein.

Over the inner edge of the portion B, of the base-frame of the trap, there is pivoted, either to the top E of the trap-box, or to the sides D, D, thereof, a strip H, which has a series of wires or rods $c$, $c$, $c$, descending vertically from its lower edge and forming a grating for a purpose which will be hereinafter set forth. There also descends in an outwardly inclining direction from the strip H, a bait-holder $b$, as represented in Fig. 3. A helical spring $f$, connects the lower edge of the hanging strip H, to the top E, of the trap-box and retains the said strip in the position shown in Fig. 3, until some pressure is exerted from within upon the grating wires $c$, $c$; and the instant that the said pressure is withdrawn, the said spring will draw back the said strip to its original position.

The series of connected and pivoted wings F, F, are arrested and temporarily retained in the position shown in the drawings by means of the arresting pin $h$, that projects from the inner side of the hanging strip H, and the elastic detent $e$, which descends obliquely from its connection with the under side of the top E, of the trap, as shown in Figs. 2, and 3. When the connected and pivoted wings F, F, are in the position above stated, one of said wings is on a level with the portion A, of the base-frame of the trap, and forms an apparently safe platform for an animal to walk upon for the purpose of reaching the bait which may be temptingly exhibited to it upon the holder $b$. But the said tempting bait being located behind the grating bars $c$, $c$, $c$, can only be reached by pressing those swinging bars out of the way; this then the animal tries to accomplish, and in doing so, he detaches the pin $h$, from its hold upon the vertical wing F, of the series of wings, and consequently, the weight of the animal upon the right-hand horizontal wing of said series, will at the same instant carry the said wing downward to a vertical position and discharge the said animal into a receptacle of water, or any other safe receptacle, that may be provided under the trap for the purpose. The impetus imparted to the series of connected and pivoted wings F, F, by the entrapping of an animal in the above described manner, will carry the said wings far enough for them to be arrested and retained in the entrapping position shown in the drawings, by the action of the pin $h$, and the detent $e$; when the trap will be ready for the reception of another customer, with its bait still untasted. In case the animal should have its paws thrust through the wires $c$, $c$, $c$, of the grating at the instant that the pin $h$, is withdrawn from its hold upon the series of wings F, F, the said paws will rest upon the rollers $d$, $d$, which will turn and prevent the animal from saving itself during its descent into the receptacle prepared for it.

The rear end of the trap may be closed by a plate of glass $g$, which will admit light into the trap and enable the bait to be readily seen.

The space at the left hand side of the trap-box may be closed by a door G, as shown in the drawings.

In the construction of animal traps I am aware that centrally pivoted revolving wings have been used in connection with a swinging grating and a bait-holder.

Therefore I claim—

Combining the rollers d, d, with the rear portion B, of the base frame of said trap in the manner and for the purpose herein set forth.

The above specification of my improvement in animal traps, signed and witnessed this 12th day of May 1860.

GEORGE SLUSSER.

Witnesses:
WM. H. TRIMBLE,
JOS. K. MARLAY.